(No Model.)
L. W. FARR.
MILK AERATOR.
No. 458,692. Patented Sept. 1, 1891.
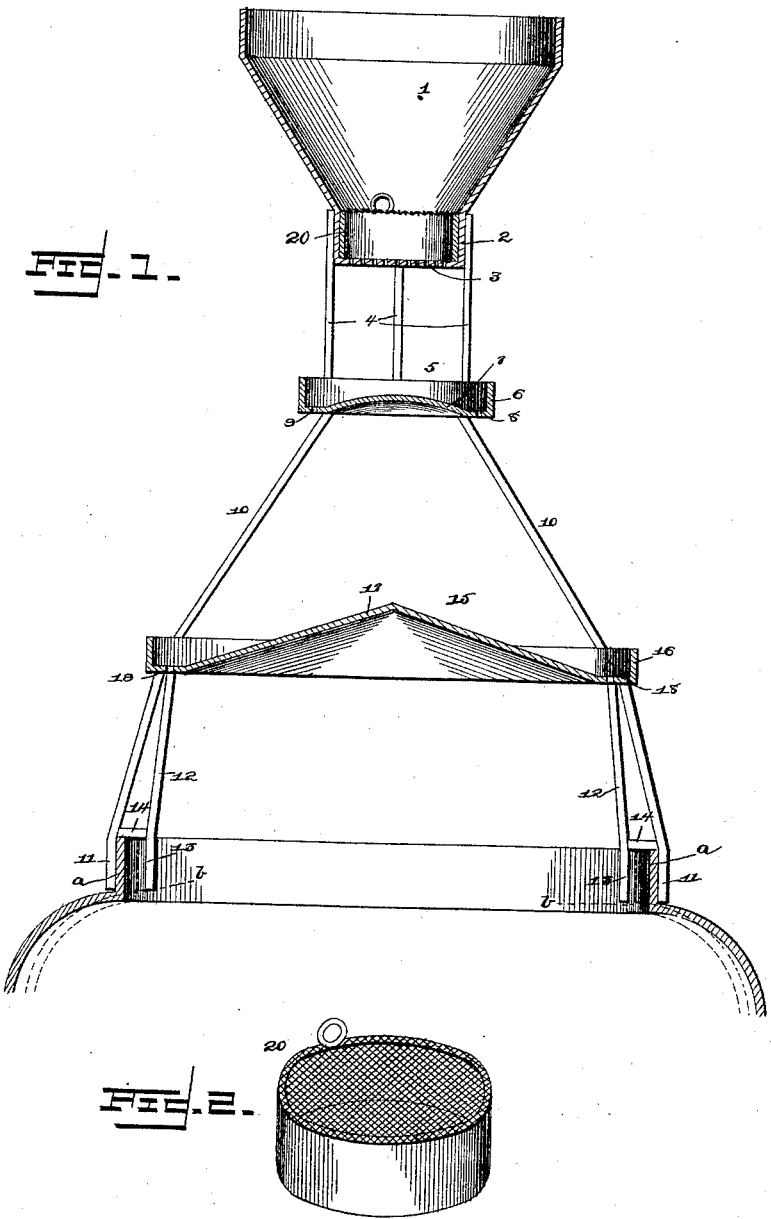
Witnesses:
E. S. Duvall Jr.
W. S. Duvall
Inventor
Lewis W. Farr.
By his Attorneys,
C. A. Snow & Co.

what
UNITED STATES PATENT OFFICE.

LEWIS WILLIAM FARR, OF MASSENA, NEW YORK.

MILK-AERATOR.

SPECIFICATION forming part of Letters Patent No. 458,692, dated September 1, 1891.

Application filed September 29, 1890. Serial No. 366,464. (No model.)

*To all whom it may concern:*

Be it known that I, LEWIS WILLIAM FARR, a citizen of the United States, residing at Massena, in the county of St. Lawrence and State of New York, have invented a new and useful Milk-Aerator, of which the following is a specification.

This invention relates to that class of milk-coolers for purifying fresh milk and liberating the animal heat and odors contained therein, known as "aerators."

The objects of my invention are to produce a cheap and simple milk-cooler or aerator adapted to more effectually aerate, cool, and purify the milk, and also designed to fit more than one size of milk-cans.

Other objects and advantages of the invention will appear in the following description, and the novel features thereof will be particularly pointed out in the claims.

Referring to the drawings, Figure 1 is a vertical longitudinal section of an aerator constructed in accordance with my invention. Fig. 2 is a detail in perspective of the removable strainer.

Like numerals of reference indicate like parts in both figures of the drawings.

1 designates an inverted truncated cone-shaped receiving-hopper, at the lower end of which is formed a reduced neck 2, covered by a foraminous bottom 3.

From opposite sides of the neck 2 depend supporting-straps or standards 4, the lower ends of which are secured to the first aerating-pan 5. The aerating-pan 5 comprises a surrounding annular wall or flange 6 and a convexed bottom 7, which near its perimeter or edge is flattened, forming a plain surrounding channel 8, horizontally disposed, which channel is perforated or foraminous, as shown at 9.

From the bottom of the aerating-pan 5 depend diverging standards 10, the same terminating near their lower ends in can-embracing fingers 11, for which purpose the standards are slightly bent, as shown. Shorter standards 12 diverge from the standards 10 near their middles, and are also bent near their lower ends to form can-embracing fingers 13, the two standards being connected by a cross-bar 14.

15 designates the second and final aerating-pan, and the same comprises a surrounding annular flange or wall 16 and a conical bottom 17, which at its base is flattened to form a horizontal channel 18, having perforations 19 formed therein. This aerating-pan 15 is secured to the standards 10 about midway the same and immediately under the aerating-pan 5, said pans being so proportioned that the milk falling from the perforations 9 of the pan 5 will strike near the apex of the conical bottom 17.

In operation the aerator is placed upon the top of the can or other vessel, of which $a$ and $b$ indicate two different sizes, illustrating how the aerator is placed in position. When the aerator is used in connection with a can of the large size, as indicated by $a$, the fingers 11 of the standards embrace the outer sides of the mouth of the can, and in instances where the aerator is mounted upon a smaller-sized can, as indicated by dotted lines $b$, the fingers 13 of the standards take against the inner side or wall of the can. The warm milk is poured into the hopper 1 and filters through a removable sieve 20, placed in the neck 2 of the hopper, and from the hopper falls through the openings or perforations 3 of the bottom upon the convexed bottom of the aerating-pan 5 and flows in a thin sheet over the convexed bottom to the annular channel 8, falls through the perforations 9 thereof upon the conical bottom 17 of the second aerating-pan 15, and after passing over said bottom is collected in the channel 18 of the pan and falls through the perforations 19 into the can below. By means of the strainer 20 any foreign bodies in the milk are caught, and by discharging the milk from the hopper to the first pan, diffusing the same over the bottoms of the pan and discharging in fine streams from said pan to the bottom of the second pan, again diffusing into a thin sheet and re-discharging into the can, the milk is cooled and aerated, so that all of the animal odors contained in the fresh warm milk are eradicated and carried off by the constant cross-currents of air passing to and fro under and over and around each of the aerating-pans. By the employment of such a device the necessity of setting the milk in open cans under sheds and other places for the purpose of ventilating is avoided, and dirt and other foreign bodies thereby prevented from gaining access to the can and milk.

Having described my invention, what I claim is—

1. The herein-described aerator, consisting of standards, a hopper located in the upper end of the same and having a foraminous bottom, and a series of convexed aerating-pans mounted below the same and graduated in size, substantially as specified.

2. The herein-described aerator, comprising the series of standards adapted for connection with the cans, a hopper of inverted-cone shape having a foraminous bottom and a reduced neck, mounted in the upper ends of the standards, a sieve removably mounted therein, the aerating-pan 5, having the surrounding walls 6, foraminous channel 8, and convexed bottom 7, and the larger aerating-pan 15, located below the first-mentioned pan and consisting of the conical bottom 17, foraminous channel 18, surrounding the same, and the annular flange 16, surrounding the channel, substantially as specified.

LEWIS WILLIAM FARR.

Witnesses:
JAMES MILLER,
GORDON ALMOND WRIGHT.